United States Patent [19]
Herrmann

[11] Patent Number: 5,818,980
[45] Date of Patent: Oct. 6, 1998

[54] POLARIZATION-INDEPENDENT, TUNABLE, ACOUSTO-OPTICAL WAVEGUIDE DEVICE FOR THE WAVELENGTH SELECTION OF AN OPTICAL SIGNAL

[75] Inventor: Harald Herrmann, Martfeld, Germany

[73] Assignee: Pirelli Cavi S.p.A., Milan, Italy

[21] Appl. No.: 808,043

[22] Filed: Mar. 4, 1997

[30] Foreign Application Priority Data

Jun. 20, 1996 [EP] European Pat. Off. .............. 96109993

[51] Int. Cl.$^6$ .................................................. G02B 6/00
[52] U.S. Cl. ................................ 385/11; 385/14; 385/15; 385/16; 385/40; 385/41; 385/46
[58] Field of Search .................................. 385/8, 7, 9, 11, 385/14, 15, 16, 17, 24, 27, 39, 40, 41, 45, 46, 132

[56] References Cited

U.S. PATENT DOCUMENTS

| | | | |
|---|---|---|---|
| 5,002,349 | 3/1991 | Cheung et al. ...................... | 385/11 X |
| 5,148,507 | 9/1992 | Tanisawa .............................. | 385/41 |
| 5,218,653 | 6/1993 | Johnson et al. ..................... | 385/11 |
| 5,381,426 | 1/1995 | Fontana et al. ...................... | 372/18 |
| 5,455,877 | 10/1995 | Baran et al. ........................ | 385/11 |
| 5,502,783 | 3/1996 | Wu ........................................ | 385/42 |
| 5,504,827 | 4/1996 | Schimpe .............................. | 385/24 |
| 5,539,850 | 7/1996 | Henry et al. ......................... | 385/48 |
| 5,542,009 | 7/1996 | Kuehnle ............................... | 385/7 |
| 5,611,004 | 3/1997 | Chang et al. ........................ | 385/11 |

OTHER PUBLICATIONS

H. Herrmann et al., "Polarization Independent, Integrated Optical, Acoustically Tunable Wavelength Filters/Switches With Tapered Acoustical Directional Coupler", IEEE Photonics Technology Letters, 6(11):1335–1337 (1994).

H. Herrmann et al., "Tapered Acoustical Directional Couplers for Integrated Acousto–Optical Mode Converters with Weighted Coupling", J. Lightwave Tech. 13(3):364–374 (1995).

F. Tian et al., "Polarization–Independent Integrated Optical, Acoustically Tunable Double–Stage Wavelength Filter in LiNbO$_3$", J. Lightwave Tech., 12(7):1192–1197 (1994).

*Primary Examiner*—Brian Healy
*Attorney, Agent, or Firm*—Finnegan, Henderson, Farabow, Garrett & Dunner, L.L.P.

[57] ABSTRACT

An acousto-optical waveguide device for the wavelength selection of an optical signal comprises two polarization conversion stages, one polarization selective input element, one polarization selective output element and two intermediate polarization selective elements located at the output of the first conversion stage and at the input of the second conversion stage, respectively; the intermediate polarization selective elements have two branches connected together and two branches not connected together located on opposite sides with respect to the branches connected together.

2 Claims, 2 Drawing Sheets

POLARIZATION-INDEPENDENT, TUNABLE, ACOUSTO-OPTICAL WAVEGUIDE DEVICE FOR THE WAVELENGTH SELECTION OF AN OPTICAL SIGNAL

BACKGROUND OF THE INVENTION

The present invention relates to a polarization independent, tunable, acousto-optical waveguide device for the wavelength selection of an optical signal.

In telecommunications networks with wavelength-division multiplexing (WDM) a plurality of optical transmission signals independent one from the other, or several channels, are transmitted in the same line, consisting, usually, of an optical fiber. Wavelength multiplexing consists in the simultaneous transmission of signals at different wavelengths. The transmission signals, or channels, can be either digital or analog and they are distinguished one from the other because each of them is associated with a specific wavelength. In a receiving station, in order to separate the individual transmission signals, or channels, filters are used capable of transmitting a wavelength band centered on the wavelength of a channel and sufficiently narrow to block the adjacent channels.

Integrated acousto-optical devices are known comprising optical waveguides obtained in a substrate of a birefringent and photoelastic material and at least one electro-acoustical transducer capable of generating a surface acoustical wave (SAW). Their operation is based on the interaction between polarized optical signals propagating in the optical waveguides and the acoustical wave propagating on the surface of the substrate.

Such acousto-optical devices can be used for wavelength selection (acousto-optical filters). In fact, by controlling the frequency of the acoustical waves, it is possible to tune the central wavelength of the filters' band. This makes them suitable, for example, for the channel separation in an optical telecommunications network with wavelength division multiplexing.

These acousto-optical filters also allow the simultaneous selection of different channels. If the acoustical wave propagating at the surface of the substrate is the superposition of acoustical waves at different frequencies, the filter exhibits a multiple pass-band corresponding to the set of different wavelength intervals, determined by the frequencies of the acoustical waves. By a suitable selection of such frequencies it is possible to control the filter so that it transmits only the desired wavelengths, corresponding to the selected channels.

In particular, tunable filters allow to change the channel selection.

Tian et al. in Journal of Lightwave Technology, Vol. 12, No. 7, July 1994, pages 1192–1197, describe a polarization-independent, integrated, tunable, double-stage acousto-optical filter.

This acousto-optical filter comprises a substrate of birefringent lithium niobate ($LiNbO_3$). TE-pass and TM-pass type polarizers are made along two parallel waveguides. An acoustical waveguide, with which an electro-acoustical transducer is associated, contains the optical waveguides with the respective polarizers. Two polarization splitters, one at the input and one at the output, capable of separating and recombining the orthogonal polarization components, are connected to the optical waveguides.

The TM-pass polarizer, in particular, comprises 1.5 mm long regions, adjacent to the optical waveguide on both sides, where the extraordinary refractive index is greater than in the rest of the substrate. The TE polarization component, whose propagation is affected by the extraordinary refractive index, is no longer guided, whereas the TM polarization component, whose propagation is affected by the ordinary refractive index, can pass the structure.

The increase in the extraordinary refractive index is obtained by proton exchange. The technique consists in using photolithographic masks and in bringing the above mentioned areas, for a preselected time, into contact with an acid solution at a suitable temperature, so as to obtain the replacement of part of the $Li^+$ ions of the substrate with $H^+$ ions, and in a possible subsequent thermal annealing step.

In particular, in the above mentioned device, the proton exchange is performed for 15.5 hours in diluted benzoic acid at 250° C. and is followed by thermal annealing for 4 hours at 330° C.

The TE-pass polarizer, 20 μm wide and 1.5 mm long, consists of layer sandwiches of 17 nm of $Y_2O_3$ and 100 nm of Al. The layers are vacuum deposited on the surface of the optical waveguide. In such a structure, the TM polarization component excites strongly damped surface plasma waves and experiences loss, whereas the TE polarization component is only little affected.

Experiments carried out by the Applicant have shown that the manufacture of polarizers by means of proton exchange is highly critical. In particular a high degree of accuracy is required in positioning the photolithographic masks. In addition, the proton exchange process parameters have small tolerances.

Further, an instability over time has been observed in the spectral properties of the polarizers.

Moreover, the manufacture of the polarizers, either of the TM-pass type, or of the TE-pass type, requires specific process steps, different for each type of polarizer and different from those required for the manufacture of the other components of the acousto-optical device. This makes the manufacturing process long and complex.

U.S. Pat. No. 5,002,349 relates to a frequency invariant acousto-optical device comprising two cascaded one-stage polarization independent filters, fabricated on the same x-cut LiNbO3 substrate. One first waveguide, coupled to an output of the first stage, is terminated in an optical absorber, such as simply interrupting the waveguide by a break of 1 mm. A second waveguide is continuous between the stages. A third waveguide, coupled to an input of the second stage, has an end close to the optical absorber. Said third waveguide is said to have a nul signal.

SUMMARY OF THE INVENTION

The Applicant has observed, however, that in this device coupling of spurious light signals might result between said first and third waveguide, even in the presence of the optical absorber, due to the close distance between the waveguide ends.

It has now been found that the above-mentioned drawbacks can be overcome with a polarization independent, tunable, acousto-optical waveguide device for the wavelength selection of an optical signal, comprising a substrate of a birefringent and photoelastic material, on which there are formed:

a) a first and a second polarization conversion stage of at least an optical signal with a preselected wavelength, b) a polarization selective input waveguide element and a polarization selective output waveguide element, connected at the input of said first polarization conversion stage and at the output of said second polarization conversion stage, respectively c) a first and a second intermediate polarization selective waveguide element, connected at the output of said first polarization conversion stage and at the input of said second polarization conversion stage, respectively, characterized in that d) said intermediate polarization selective waveguide elements have two branches connected together and two branches not connected together and terminating in the substrate, said two branches not connected together being located on opposite sides with respect to said two branches connected together.

Preferably said first and second polarization conversion stage are substantially not collinear one with the other.

As used in the present description and in the claims appended hereto, the term "not collinear" is intended to mean that said first and second polarization conversion stage are not aligned in a straight line. Preferably, they are parallel and laterally shifted relative to each other.

One of the main advantages of the acousto-optical waveguide device for the wavelength selection of an optical signal, made according to the invention, consists in the possibility of obtaining it with a very simple manufacturing process, all the optical components being optical waveguide components and thus formed simultaneously, in one single step.

Other advantages of the device according to the invention consist in the fact that it has an extended tuning range and it exhibits spectral characteristics that are highly stable over time.

Moreover, the staggered connection between the intermediate polarization selective elements allows the reduction of crosstalk phenomena, limiting transfers of optical power associated with residual signals from an optical waveguide branch to an adjacent optical waveguide branch.

BRIEF DESCRIPTION OF THE DRAWINGS

Features and advantages of the invention will now be illustrated with reference to an embodiment represented as a non-limiting example in the enclosed drawings, wherein.

DETAILED DESCRIPTION OF THE INVENTION

Figure 1:
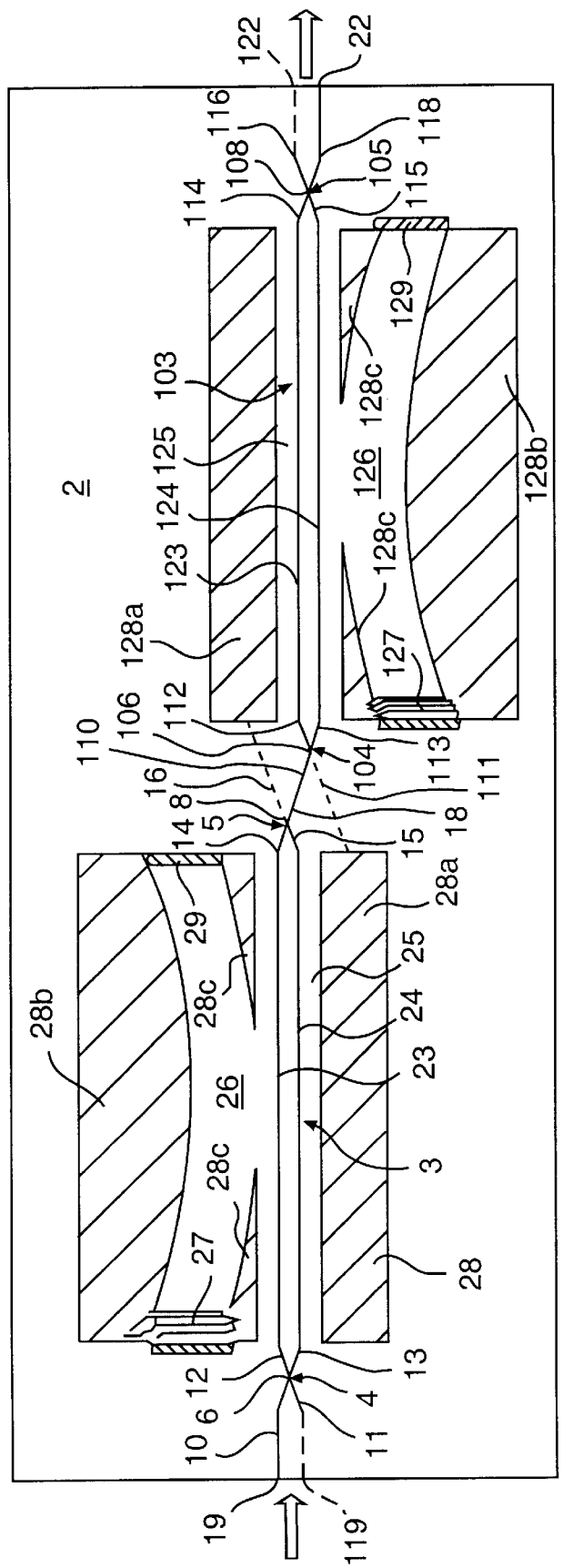
FIG. 1 shows schematically an acousto-optical waveguide device for the wavelength selection of an optical signal, made according to the invention.

There is shown in FIG. 1 a polarization independent, tunable, acousto-optical waveguide device for the wavelength selection of an optical signal, made according to the invention. The device comprises a substrate 2 of a lithium niobate ($LiNbO_3$) crystal, cut perpendicularly to the x axis and with optical radiation propagating along the y axis.

In the substrate 2 there are formed two polarization conversion stages, indicated as a whole with 3 and 103, one input polarization selective element, indicated as a whole with 4, two intermediate polarization selective elements, indicated as a whole with 5 and 104, and one output polarization selective element, indicated as a whole with 105.

The polarization conversion stages 3,103 are substantially parallel and laterally shifted relative to each other (not collinear one with the other).

The polarization conversion stage 3 comprises two optical waveguides 23 and 24, straight and parallel, one acoustical waveguide 25 containing the two optical waveguides 23 and 24 and one acoustical waveguide 26 containing an electro-acoustical transducer 27.

The polarization conversion stage 103 comprises two optical waveguides 123 and 124, rectilinear and parallel, one acoustical waveguide 125 containing the two optical waveguides 123 and 124 and one acoustical waveguide 126 containing an electro-acoustical transducer 127.

The polarization selective elements 4, 5, 104 and 105 (or polarization splitters) comprise each one multimode optical waveguide (preferably bimodal) 6, 8, 106, 108, connected at its two ends to respective branches, or connecting waveguides, 10, 11, 12, 13; 14, 15, 16, 18; 110, 111, 112, 113; 114, 115, 116, 118. A polarization selective element is capable of separating toward different output branches (for example, 12 and 13, in the case of selective element 4) the orthogonal polarization components TM and TE of an optical signal present at input to one branch (10) and of sending toward a single output branch (for example, 18 in the case of selective element 5) optical signals with a polarization TM and TE, respectively, present at input on branches (15 and 14) connected to the same end of a multimode waveguide (8).

The connecting branch 10 is connected to an input gate 19 and the branch 118 is connected to an output gate 22.

In one particular embodiment of the present invention, the connecting branch 11 is connected to an input gate 119 and the connecting branch 116 is connected to an output gate 122, as indicate d with dashed lines in the figure.

According to the invention, the intermediate polarization splitters 5 and 104 are connected one to the other through the respective branches 18 and 110, connected in series. However, the branch 16 of polarization splitter 5 and the branch 111 of polarization splitter 104, that are located on opposite sides with respect to said branches 18 and 110 connected in series, terminate in the substrate 2 or, in a preferred embodiment, inside portions 28a and 128a of areas circumscribing the acoustical waveguides (described later), as shown with dashed lines in FIG. 1.

The positioning of the connecting branches 16 and 111 on opposite sides, with respect to the branches 18 and 110 connected together, limits the coupling of spurious radiation between the branches 16 and 111 and thus allows a very low crosstalk to be obtained between the branches themselves. According to what has been observed by the Applicant, the reduction in crosstalk that is obtained between the branches not connected together of the polarization splitters allows an improvement to be made in the overall performance of the device, in particular the crosstalk between communication channels at different wavelengths.

The electro-acoustical transducers 27 and 127 are formed by interdigital electrodes capable of generating surface acoustical waves at radio frequency that, in the polarization conversion stages 3, 103, are collinear with the optical signals entering through gate 19 of the acousto-optical filter.

The acoustical waveguides 25, 26 and 125, 126 are bounded by areas 28a, 28b, 28c and 128a, 128b, 128c of increased speed for the acoustical waves (acoustical cladding). At the ends of acoustical waveguides 26 and 126, respective acoustical absorbers 29 and 129 are arranged. Acoustical waveguides 26 and 126 are respectively on side of acoustical waveguides 25 and 125, and form with them acoustical couplers. The acoustical coupling between the acoustical waveguides 25 and 26 and between acoustical waveguides 125 and 126 is made in a way that the intensity profile of the surface acoustical wave along the waveguides 25 and 125 has a maximum in the central portion of such guides and two minima at the ends of the waveguides themselves. Optical signals propagating along optical waveguides 23, 24 and 123, 124 interact with an acoustical wave having an intensity increasing up to about half-way along said waveguides and decreasing in the other half of the waveguides, in an area having a preselected length of interaction.

Acousto-optical filters with acoustical couplers are, per se, known, e.g. from the articles of H. Herrmann, K. Schafer, W. Sohler "Polarization independent, integrated optical acoustically tunable wavelength filters/switches with tapered acoustical directional coupler", Photonics Technol. Lett., Vol. 6, S. 1192–1194 (1994) and of H. Herrmann, U. Rust, K. Schäfer "Tapered acoustical directional couplers for integrated acousto-optical mode converters with weighted coupling", J. Lightwave Technol. 13, S. 364–374 (1995).

The input gate 19 and the output gate 22 are connected to line optical fibers, not shown, by means of connecting elements, also not shown.

Operation of the acousto-optical filter is as follows.

When the polarization conversion stage 3 has been switched off (off-state), it is in the condition of direct transmission (bar-state). The optical signals enter through the input gate 19 and in the polarization splitter 4 their orthogonal components TM and TE are separated. The polarization components propagate separately in the waveguides 23 and 24, they are recombined in the polarization splitter 5, that acts as a coupler, and leave through the branch 16 dispersing in the substrate 2, where they can be absorbed by means of an optical absorber (not shown), or in the acoustical cladding area 128a.

Applying an appropriate signal to the electrodes of the electro-acoustical transducers 27 and 127, the polarization conversion stages 3 and 103 are switched on (on-state) and operate in the condition of crossed transmission (cross-state). In the conversion stages 3 and 103, a polarization conversion of the orthogonal polarization components TM and TE takes place. The optical signals enter through gate 19, their orthogonal polarization components TM and TE are separated in the polarization splitter 4 and they propagate separately in the waveguides 23 and 24 of the conversion stage 3, where they interact with the surface acoustical wave emitted by the transducer 27 and they are subjected to a polarization conversion in the orthogonal polarization state TM→TE and TE→TM.

At the output of the conversion stage 3 the orthogonal polarization components TM and TE are recombined in the polarization splitter 5 and leave through the intermediate cross-state output constituted by the branch 18. The polarization components in the recombined form are transmitted by the cross-state output 18 to the input of the conversion stage 103, constituted by the branch 110 connected to the polarization splitter 104. In the polarization splitter 104 the orthogonal components TM and TE of the optical signals are separated and they propagate separately in the optical waveguides 123 and 124 of the conversion stage 103, where they interact with the surface acoustical wave emitted by the transducer 127, and they are subjected to a polarization conversion in the orthogonal polarization state TM→TE and TE→TM.

At the output of the conversion stage 103 the orthogonal polarization components TE and TM are recombined in the polarization splitter 105 and they propagate in the connecting branch 118, connected to the cross-state output gate 22.

In the conversion stage 3 the orthogonal polarization components TM and TE are subjected to a polarization conversion in the orthogonal state that is accompanied by a frequency shift. The sign of the frequency shift depends on the polarization and on the direction of propagation of the surface acoustical wave generated by the transducer 27 in relation to the direction of propagation of the optical wave (collinear or counterlinear). Passing into the conversion stage 103, the frequency shift is compensated by the reverse conversion of the polarization components TM and TE to the original polarization state, as the surface acoustic wave generated by the transducer 127 propagates in the same direction and has substantially the same frequency as the acoustical wave generated by the transducer 27. The same frequency is obtained for the two acoustical waves by supplying a single electrical driving signal to the two transducers 27 and 127.

The transducers 27 and 127 generate surface acoustical waves at radio frequency $f_{ac}$ (about 174±10 MHz, for devices operating at 1550 nm) corresponding to the optical resonance wavelength at which the polarization conversion TE→TM and TM→TE takes place.

The acousto-optical device described selects the optical signals having a wavelength corresponding to the driving acoustical frequency and operates as a tunable band-pass filter.

The acousto-optical filter according to the invention has the advantage that it is reversible meaning that the output gate 22 can be used as an input gate and the input gate 19 can be used as an output gate.

The acousto-optical filter according to the invention offers, as already said, technological advantages with respect to the acousto-optical filter of the known art because it allows a considerable simplification of the manufacturing process.

The filter according to the invention, in comparison with a filter according to the known art (for example of the type described in the above mentioned article of Tian et al.), has the following performance.

Insertion losses in the device according to the invention are due to the attenuation of the optical waveguides and of the four polarization splitters. In contrast, in the case of the device described by Tian, in addition to the attenuation of the optical waveguides and of the two polarization splitters, there are losses due to the polarizers: in particular the TM-pass polarizer can have an attenuation for the TM component, due to the less-than-perfect alignment of the photolithographic masks used in the manufacture, while the TE-pass polarizer can exhibit an attenuation, for the same TE component, due to the metal layers included in it.

In each conversion stage of the device according to the invention a suppression takes place of the sidelobes of the response curve of about 20 dB and thus the total suppression of the sidelobes of the response curve of the filter amounts to about 40 dB. However, in the filter of the known art the optimum suppression of the sidelobes is theoretically limited to about 24 dB if the positioning of the polarizers is appropriately chosen.

The baseline has, in the device according to the invention, a value equal to the square of the splitting ratio of the worst polarization splitter (with a splitting ratio of only 15 dB the baseline is about 30 dB below the maximum transmission in the passband), while in the filter of the known art it is determined by the worst polarizer.

The tuning range is determined by the band width of the transducers and by the dependence of the polarization splitters on the wavelength, while in the filter of the known art it is also influenced by the dependence of the polarizers on the wavelength.

The filter according to the invention is not subjected to a degradation in performance over time, thus it does not exhibit any ageing problem, whereas the filter of the known art shows a strong reduction in the extinction ratio after several months, due to degradation of the TE-pass polarizer, while degradation of the TM-pass polarizer can cause a reduction in the extinction ratio at high storage temperatures.

Figure 2:
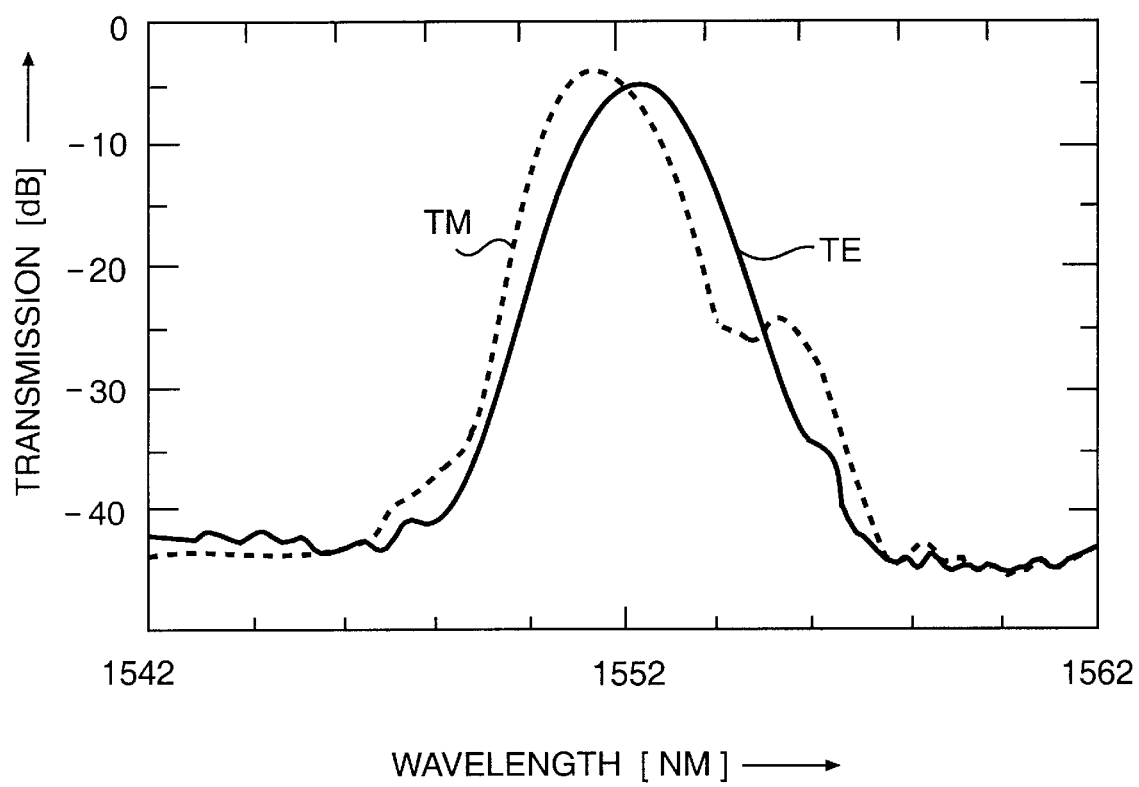
FIG. 2 shows spectral transmission curves of the acousto-optical device of FIG. 1.

In FIG. 2 the spectral transmission curves observed experimentally for the TM component (dashed line) and for the TE component (continuous line) of an acousto-optical filter made according to the invention are shown. On the y-axis the transmission in decibels (dB) is reported, against the wavelength in nanometers (nm) on the x-axis.

The acousto-optical filter has been made with an overall length of 68 mm and has been connected to optical fibers. The filter included two polarization conversion stages provided with two independent temperature stabilization circuits.

The following performance has been observed in the filter:

| | |
|---|---|
| insertion losses (worst polarization): | <5 dB |
| polarization dependence of insertion losses: | <0.5 dB |
| band width full-width-half-maximum, (FWHM): | ≈2 nm |
| crosstalk: | |
| with a separation of 3 nm between the channels: | <−23.5 dB |
| with a separation of 4 nm between the channels: | <−26.5 dB |
| baseline | <−35 dB |
| radio frequency power per stage | ≈60 mW. |

The acousto-optical filter according to the invention is suitable for operation at room temperature. The filter can be operated to transmit one or more optical signals in the wavelength range between 1500 nm and 1600 nm, that is particularly interesting for optical telecommunications.

The substrate 2, as already said, consists of a crystal of lithium niobate cut perpendicularly to the crystallographic axis x and the optical paths in optical waveguide 23, 24, 123, 124 are directed along the y-axis of the crystal. Instead of the lithium niobate, another birefringent, photoelastic material can be used selected from the group $LiTaO_3$, $TeO_2$, $CaMoO_4$.

The optical waveguides and the polarization splitters can be made by means of diffusion in the substrate 2 of a compound capable of increasing the refractive index. Using a photolithographic mask, it is possible to execute the deposition of a layer of Ti having a thickness, for example, of about 105 nm and subsequent diffusion for 8 hours at a temperature of 1060° C. At the waveguides 23, 24, 123, 124, at the connecting branches of the polarization splitters and at the connecting waveguides between said branches and the output and input gates, the mask exhibits, for example, an opening having a width of about 7 microns.

The acoustical waveguides 25, 26, 125 and 126 can be made by photolithography, defining the areas 28a, 28b, 28c, 128a, 128b, 128c on the substrate 2 where the acoustical cladding is formed. Within said areas a deposition of a layer of Ti with a thickness, for example, of 160 nm takes place, followed by a subsequent diffusion of Ti in the substrate for 31 hours in an oven at a temperature of 1060° C. Due to the Ti diffusion, the speed of the acoustical waves increases by about 0,3%, so that areas 28a, 28b, 28c, 128a, 128b and 128c confine the acoustical waves along the guides 25, 26, 125 and 126.

The optical waveguides, except for the waveguides 6, 8, 106, 108, are preferably monomode for the optical waves used.

The electro-acoustical transducers 27 and 127 can for example include 20 or more pairs of interdigital electrodes. The period of the electrodes is selected in relation to the wavelength in the lithium niobate of a surface acoustical wave operating the TM→TE conversion at the optical wavelength of interest, for example, about 1550 nm. The device according to the example can be tuned in a range of wavelengths from about 1500 nm to about 1600 nm. The electrodes can be made by depositing on the substrate a metal layer, say aluminum, having a thickness of 500 nm.

I claim:

1. A polarization independent, tunable, acousto-optical waveguide device for the wavelength selection of an optical signal, comprising a substrate of a birefringent and photoelastic material, on which there are formed:

a) a first and a second polarization conversion stage of at least an optical signal with a preselected wavelength, b) a polarization selective input waveguide element and a polarization selective output waveguide element, connected at the input of said first polarization conversion stage and at the output of said second polarization conversion stage, respectively c) a first and a second intermediate polarization-selective waveguide element, connected at the output of said first polarization conversion stage and at the input of said second polarization conversion stage, respectively, characterized in that d) said intermediate polarization-selective waveguide elements have two branches connected together and two branches not connected together and terminating in the substrate, said two branches not connected together being located on opposite sides with respect to said two branches connected together.

2. An acousto-optical device according to claim 1, characterized in that said first and second polarization conversion stage are substantially not collinear one with the other.

* * * * *